United States Patent Office 3,754,046
Patented Aug. 21, 1973

3,754,046
CONTROL OF MOLECULAR WEIGHT AND MOLECULAR WEIGHT DISTRIBUTIONS OF UNSATURATED POLYMERS
Nissim Calderon, Akron, and Kenneth W. Scott, Cuyahoga Falls, Ohio, assignors to The Goodyear Tire & Rubber Company, Akron, Ohio
No Drawing. Filed Dec. 4, 1969, Ser. No. 882,269
Int. Cl. C07c 11/12, 3/00
U.S. Cl. 260—677 R         16 Claims

ABSTRACT OF THE DISCLOSURE

A method of controlling the molecular weight and the molecular weight distribution of unsaturated polymers by subjecting the polymers to a catalytic olefin metathesis reaction while said polymers are in contact with an acyclic unsaturated compound, such as an olefin.

---

This invention relates to a new and novel method of controlling molecular weights of polymeric materials containing carbon-to-carbon olefinic double bonds. In particular, the invention utilizes the catalyzed olefin metathesis reaction for the purpose of varying molecular weights of unsaturated polymeric materials.

The olefin metathesis reaction is a unique bond-reorganization process, whereby materials possessing carbon-to-carbon double bonds, undergo a redistribution of constituents as depicted in the following equation:

$$2R_1CH=CHR_2 \rightleftharpoons R_1CH=CHR_1 + R_2CH=CHR_2$$

Being an equilibrium process, olefin metathesis facilitates:
(1) obtaining the product olefins $R_1CH=CHR_1$ and $R_2CH=CHR_2$ using $R_1CH=CHR_2$ as a starting material; or alternatively, (2) obtaining $R_1CH=CHR_2$ as a product from a starting mixture comprised of $R_1CH=CHR_1$ and $R_2CH=CHR_2$.

One aspect of this invention is control of molecular weight of unsaturated polymers by the olefin metathesis reaction. If the process is carried out on a mixture of: (1) a polymeric material containing carbon-to-carbon double bonds along the main chain, e.g. polyoctenamer, and (2) a low molecular weight open chain olefin, e.g. 2-pentene, it can be shown that the olefin metathesis reaction will lead to a general reduction of the molecular weight of the original polymeric material accompanied by incorporation of the olefin fragments as chain ends:

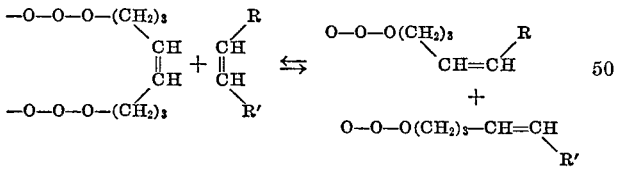

where $$O\equiv\pm(CH_2)_3-CH=CH-(CH_2)_3\pm$$

for the case of polyoctenamer. R and R′=methyl and ethyl groups respectively for the case of 2-pentene.

Thus, the invention may be said to be a chemical reaction involving subjecting one unsaturated reactant that is free of any non-aromatic conjugated selected from the groups of:

(A) A polymeric material possessing at least two repeat units of the general Formula I:

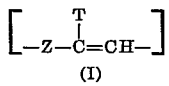

(I)

wherein:

(1) T is (a) hydrogen; or
(b) a substituent corresponding to the formula

D—$CH_2$—, where D is any member of the group of alkyl, aryl, aralkyl, alkaryl, alkenyl, cycloalkyl, cycloalkenyl, bicycloalkyl, bicycloalkenyl and hydrogen; and
(2) Z represents a fragment having at least two carbon atoms that are members of the polymeric main chain and any of the said carbon atoms of Z may be
   (a) interconnected by single or double bonds;
   (b) substituted by one or more members of the group alkyl, aryl, aralkyl, alkaryl, alkenyl, cycloalkyl, bicycloalkyl, cycloalkenyl and bicycloalkenyl;
   (c) constituents of aromatic, alicyclic and chlorinated alicyclic rings and
(B) At least one unsaturated cyclic compound member of the group consisting of
(1) alicyclic compounds corresponding to the formula

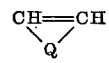

wherein:

(a) Q is a fragment which comprises a sequence of at least 6 carbon atoms situated in linear succession between the methylidene carbons which constitute the double bond;
(b) the carbon atoms in the linear succession of Q may be interconnected by both carbon-carbon single bonds and carbon-carbon double bonds;
(c) any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;
(d) any of said carbon atoms in the linear succession of Q may be constituents of aromatic rings, alicyclic rings and chlorinated alicyclic rings; and (2) alicyclic compounds corresponding to the formula:

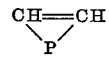

wherein:

(a) P is a fragment which comprises a sequence of at least 2 and not more than 3 carbon atoms situated in linear succession between the methylidene carbons which constitute the double bond;
(b) the carbon atoms in linear succession of P are connected by carbon to carbon single bonds;
(c) any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;
(d) any of said carbons in linear succession of P may be constituents of aromatic rings, alicyclic rings and chlorinated alicyclic rings;

in the presence of an acyclic unsaturated compound (acyclic olefin) corresponding to the general formula:

$$G_2C=CHG$$

wherein:

G is hydrogen or D—$CH_2$—, where D is any member of the group of: alkyl, aryl, aralkyl, alkaryl, alkenyl, cycloalkyl, cycloalkenyl, bicycloalkyl, bicycloalkenyl and hydrogen; to a catalyst capable of inducing the olefin metathesis reaction.

The extent of molecular weight reduction is adjustable by the selection of a proper polymer/olefin ratio. This can be established with ease for any particular system by conducting a series of routine experiments by one skilled in the art. In general, weight ratios of polymer to acyclic olefin will be less than 100,000 to 1, preferably less than 10,000 to 1 and most preferably less than 5,000 to 1.

For the purposes of this invention, an olefin metathesis catalyst may be defined as a catalyst capable of inducing an olefin metathesis reaction and is one that, when present in a catalytic amount, will convert at least one percent of 2-pentene into a mixture of 2-butene, 3-hexene and 2-pentene in a period of one hour at a temperature less than 100° C. under the reaction conditions described in the Journal of the American Chemical Society, 90, 4133 (1968).

The catalysts employed in the invention which will be described extensively elsewhere in the present application are capable of promoting ring opening polymerization of cycloolefins by the same metathesis reaction:

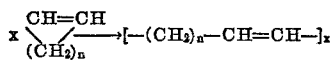

Hence, the products obtained in the ring opening polymerization or copolymerization of cycloolefins are polymers possessing invariably carbon-to-carbon double bonds along their main polymeric chains. Therefore, it is within the scope of this invention to carry out the ring opening polymerization and the control of the molecular weights in "one step" by incorporation of the desired amount (similar to the above) of an acyclic olefin in the cycloolefin polymerization reaction prior to, or during, the exposure of the system to the olefin metathesis catalyst.

An extension of this aspect of the present invention is to conduct the "one step" cycloolefin polymerization in the presence of acyclic olefins at low cycloolefin to acyclic olefin molar ratios. Under these reaction conditions it is possible to direct the process towards formation of polymers having extremely low molecular weights. If an extremely low cycloolefin/acyclic olefin molar ratio is maintained, the metathesis of this mixture will yield products which consist primarily of unsaturated polyolefins possessing two or more carbon-to-carbon double bonds. To demonstrate this feature of the invention, the olefin metathesis reaction of 1-pentene and cyclooctene is cited, carried out at a molar ratio of cyclooctene/1-pentene lower than 1.0.

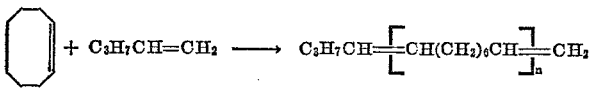

$n = 0, 1, 2, 3$, etc.

Typical molar ratios of cycloolefin to acyclic olefin to optimize this aspect of the invention fall in the range of 100 to 1 to 0.01 to 1 and preferably in the range of 10 to 1 to 0.1 to 1 and more preferably 2 to 1 to 0.2 to 1.

1,5-cyclooctadiene or 1,5,9-cyclododecatriene may be reacted with α-olefins to yield non-conjugated, polymerizable polyenes or multiolefins, such as 1,5,9-undecatriene; 1,5,9,13-pentadecatetraene; 1,5,9,13,17-monodecapentaene; 1,5,9,13,17,21-tricosahexaene; and 1,5,9,13,17, 21,25-heptacosaheptaene which are obtained by the reaction of these cyclopolyolefins with propylene. These cyclopolyolefins are preferred over cyclomonoolefins since they incorporate more unsaturation in the product which is desirable. Almost as much unsaturation may be incorporated by using cyclopentene as a reactant. The preferred compounds have the structure D$\{$CH=CH—(CH$_2$)$_m\}_n$CH=CH$_2$ where D is any member of the group alkyl, aryl, aralkyl, alkaryl, alkenyl, cycloalkyl, cycloalkenyl, bicycloalkyl, bicycloalkenyl and hydrogen; $m$ is 2 or 3, $n$ is 2 or greater and this multiolefin compound has 11–27 carbon atoms, none of which are aliphatically conjugated. The most preferred compounds are those in which D is a methyl group and/or $m$ equals 2.

The control of molecular weights and molecular weight distribution according to the present invention can be carried out on any unsaturated polymers or copolymers that possess carbon to carbon double bonds, as constituents of the backbone of their main chains and said double bonds are reactive towards olefin metathesis catalysts. Other polymers whose molecular weights and molecular weight distributions can be controlled by the present invention are polymers that are free of non-aromatic conjugation and can be generally represented by the following polymeric repeat unit formula:

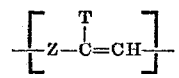

wherein:

(1) T is (a) hydrogen; or
  (b) a substituent corresponding to the formula D—CH$_2$—, where D is any member of the group: alkyl, aryl, aralkyl, alkaryl, alkenyl, cycloalkyl, cycloalkenyl, bicycloalkyl, bicycloalkenyl, and hydrogen; and
(2) Z represents a fragment having at least two carbon atoms that are members of the polymeric main chain, and any of the said Z carbons may be:
  (a) interconnected by single or double bonds;
  (b) substituted by one or more members of the group: alkyl, aryl, aralkyl, alkaryl, alkenyl, cycloalkyl, bicycloalkyl, cycloalkenyl, bicycloalkenyl; and
  (c) constituents of aromatic alicyclic and chlorinated alicyclic rings.

Typical examples of such polymers are polybutadiene, polyisoprene, and polyalkenamers corresponding to the general formula $\{(CH_2)_m-CH=CH\}_n$ such as polybutenamer, polypentenamer, polyoctenamer, polydecenamer polydodecenamer and the like. This invention is applicable to copolymers having unsaturation in the main chain of some of the copolymeric repeat units such as copolymers of butadiene, isoprene and cycloolefins, for example, copolymers of butadiene and styrene; isoprene and styrene; and cyclooctene and cyclopentene. Suitable polymers may be liquid rubbers having 20–200 polymeric repeat units. Other suitable polymers may be solid rubbers having more than 200 polymeric repeat units per number average molecular weight molecule.

Acyclic olefins which can be employed for the purpose of molecular weight control of unsaturated polymers by the olefin metathesis reaction, and also in the in situ molecular weight regulation during polymerizations of cycloolefins by ring opening, can be any low molecular weight open-chain unsaturated compound which possesses at least one aliphatic type carbon-to-carbon double bond which is reactive toward the olefin metathesis reaction.

Such acyclic unsaturated compounds may be any members having the structures:

G$_2$C=CH$_2$; GHC=CH$_2$; GHC=CHG; and G$_2$C=CHG wherein G is hydrogen or D—CH$_2$—, where D is any member of the group alkyl, aryl, aralkyl, alkaryl, alkenyl, cycloalkyl, cycloalkenyl, bicycloalkyl, bicycloalkenyl, and hydrogen. Some selected examples of these compounds are ethylene, propylene, n-butene-1, n-pentene-1, n-hexene-1, 2-butene, 2-pentene, 2-hexene, isobutylene, 2-methylpentene-1, 2-methylpentene-2, etc.

Cycloolefins which may undergo ring opening polymerizations by olefin metathesis catalysts, and thus be eligible for the simultaneous regulation of molecular weight during polymerization by the incorporation of acyclic olefins in the process, are selected from the group consisting of:

(A) Alicyclic compounds corresponding to the formula:

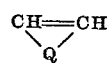

wherein:

(1) Q is a fragment which comprises a sequence of at least 6 carbon atoms situated in linear succession between the methylidene carbons which constitute the double bond;
(2) the carbon atoms in the linear succession of Q may be interconnected by both carbon-carbon single bonds and carbon-carbon double bonds;
(3) any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;
(4) any of said carbon atoms in the linear succession of Q may be constituents of aromatic rings, alicyclic rings and chlorinated alicyclic rings; and
(5) said alicyclic unsaturated hydrocarbon contains no non-aromatic conjugated duoble bonds; and (B) Alicyclic compounds corresponding to the formula:

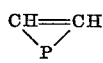

wherein:

(1) P is a fragment which comprises a sequence of at least 2 and not more than 3 carbon atoms situated in linear succession between the methylidene carbons which constitute the double bond;
(2) the carbon atoms in linear succession of P are connected by carbon to carbon single bonds;
(3) any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;
(4) any of said carbons in linear sucession of P may be constituents of aromatic rings, alicyclic rings and chlorinated alicyclic rings, and
(5) said alicyclic unsaturated hydrocarbon compound contains no non-aromatic conjugated double bonds.

Typical examples of such cycloolefins are cyclobutene, cyclopentene, cyclooctene, cyclododecene, 1,5-cyclooctadiene, 1,5,9-cyclododecatriene and hexachlorotetracyclododecadienes, such as 1,2,3,4,10,10-hexachloro-1,4,4a,5,8,8a-hexahydrodimethanonaphthalenes.

A variety of catalyst systems are effective in promoting the olefin metathesis reaction and the ring-opening polymerization of unsaturated alicyclic monomers, and hence, can be considered as possible catalysts for the reactions which are the subject of this invention. These catalysts may be either heterogeneous or homogeneous with the former having the advantage of ease of removable from reactants while the latter are more efficient.

One class of homogeneous catalysts employed in this invention is a combination comprising: (A) at least one organometallic compound wherein the metal is selected from the group consisting of Ia, IIa, IIb and IIIa groups of the Periodic Table of Elements, (B) at least one metal derivative wherein the metal is selected from the group consisting of molybdenum and tungsten and (C) at least one compound selected from the group consisting of oxygen and compounds of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a group selected from hydroxyl (OH) and thiol (SH) and oxygen. The Periodic Table of Elements referred to may be found in the Handbook of Chemistry and Physics, 44th Edition, April 1962 reprint, published by the Chemical Rubber Publication Company, Cleveland, Ohio, U.S.A., p. 448.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organometallic compounds are compounds of lithium, sodium, magnesium, aluminum, zinc and cadmium with aluminum being most preferred.

Representative examples of organometallic compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum, and the like; triarylaluminums such as tritolylaluminum, tribenylzaluminum, triphenylaluminum, and the like; dialkylaluminum halides such as diethylaluminum chloride, di-n-propylaluminum chloride, diisobutylaluminum chloride, diethylaluminum bromide, diethylaluminum iodide and diethylaluminum fluoride and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride, the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like. Other organometallic compounds are also useful in the practice of this invention. Representative of such organometallic compounds are organoalkali metal compounds such as alkyllithium compounds as ethyllithium, n-butyllithium, t-butyllithium and the like; lithium-aluminum-tetraalkyls such as lithium-aluminum-tetrabutyl, lithium-aluminum-tetraethyl, and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide, and the like; calicum, strontium and barium organo compounds such as barium alkyls and aryls of Groups IIb metals such as diethylzinc, diphenylzinc, ethylzinc chloride, diethylcadmium, dibutylcadmium, and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminum, dialkylaluminum halides, alkylaluminum dihalides and aluminum sesquihalides.

The metal derivatives employed in the catalyst of this invention as the second or (B) catalyst component are selected from the derivatives of molybdenum and tungsten. Representatives of such derivatives include halides such as chlorides, bromides, iodides and fluorides, which include compounds such as molybdenum pentachloride, tungsten hexachloride, molybdenum pentabromide, tungsten hexabromide, molybdenum pentaiodide, molybdenum pentafluoride, molybdenum hexafluoride and tungsten hexafluoride. Other representative salts are those of acetylacetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides, representative of which are tungsten hexachloride and molybdenum pentachloride.

The third or (C) component of the catalyst system of this invention is selected from the group consisting of oxygen and compounds which respond to the formula R—Y—H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and (9) radicals of (2) through (6) wherein at least one hydrogen of R is substituted by at least one hydroxyl (OH) or thiol (SH) group.

Thus, the formula above defines a number of types of compounds. It defines water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of materials corresponding to the formula above are alcohols representative of which are methanol, ethanol, isopropanol, tertiarybutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl and similar mercaptans, allyl mercaptan, thiophenol, 4-methylthiophenol, 4-mercaptophenol; the hydroperoxides such as cumyl hydroperoxide, tertiarybutyl hydroperoxide; the hydrodisulfides such as cumyl hydrodisulfide, sec-butyl hydrodisulfide; the polyalcohols such as ethylene glycol, glycerol, and similar polyglycols; catechol, resorcinol, hydroquinone, pyrogallol; the polymercaptans such as 1,3-propane dithiol, 1,4-dithiobenzene; the hydroxymercaptans or thioalcohols such as ethane-2-ol-1-thiol, 1-hydroxy-4-thiobenzene.

Since the instant invention contemplates the use of organometallic compounds in combination with transition metal salts and various oxygen and sulfur-containing compounds, and since various factors or considerations will influence the optimum range of the three catalyst components in relation to each other, the molar ratios of the three components which optimize the reaction conditions cannot be readily set forth. However, by following the teachings found in this application, those skilled in the art can readily determine the optimum molar ratio of the three catalyst components to each other.

It has been found that good results are obtained in the practice of this invention when the molar relationship between the three catalyst components, A, B and C as previously defined, are within a molar ratio of $B/C$ ranging from about 0.3/1 to at least about 20/1 and the molar ratio of $A/B$ is within the range of about 0.5/1 to at least 15/1. More preferred ratios are $B/C$ of 0.5/1 to 5/1 and $A/B$ of 0.5/1 to 8/1. Still more preferred ratios are $B/C$ of 1/1 to 2/1 and $A/B$ of 0.75/1 to 5/1.

The catalyst systems set forth above and useful in the practice of this invention are prepared by mixing the components by known techniques. Thus, the catalyst systems may be prepared by "preformed" or "in situ" techniques. By the "preformed" method the catalyst components are mixed together prior to exposure of any of the catalyst components to the unsaturated reactants to be used in the process of this invention. In the "in situ" method the catalyst components are added separately to the reactants to be used in the process of this invention. The catalyst components may be mixed either as pure compounds or as suspensions or solution in liquids which do not adversely affect catalyst activity of the olefin metathesis reaction. Representative of such liquids are saturated hydrocarbons such as hexane, pentane and the like, or aromatics such as benzene, toluene and the like.

While the presence of the unsaturated reactants are not essential during the formation of active catalyst by a mixing of components A, B and C, and this fact facilitates the use of "preformed" catalysts, it has been found that freshly preformed catalysts are generally more active than catalysts which have been allowed to age before use.

The order of addition of the three catalysts components to each other is of interest in the practice of this invention.

There are various methods in which the three catalyst components can be brought into contact with the unsaturated reactants or unsaturated reactants/solvent mixture. The following is a numerical listing of these various methods in which A, B and C stand for the catalyst components previously defined:

(1) Simultaneous addition of A, B and C;
(2) C followed by A and B which were previously preformed;
(3) A and B preformed followed by C;
(4) A followed by B and C which were preformed;
(5) B and C preformed followed by A;
(6) B followed by A and C which were preformed;
(7) A and C preformed followed by B;
(8) A followed by B followed by C;
(9) B followed by A followed by C;
(10) C followed by B followed by A;
(11) C followed by A followed by B;
(12) B followed by C followed by A;
(13) A followed by C followed by B;
(14) Preformed A, B and C which was prepared by adding A to B and C preformed;
(15) Preformed A, B and C which was prepared by adding B to A and C preformed; and
(16) Preformed A, B and C which was prepared by adding C to A and B preformed.

The amount of catalyst employed in the reactions of this invention may be varied over wide concentrations and has not been found to be critical. Of course, a catalytic amount of the catalyst must be employed. The optimum amount of catalyst depends upon a number of factors such as temperature, purity of reactants, reaction times desired, and the like. The processes of this invention can be conducted wherein the amount of catalyst employed is about 0.01 part by weight of B per 100 parts by weight of unsaturated reactants employed, with components A and C adjusted to yield a desirable molar ratio of $A/B/C$. Those skilled in the art will readily determine the optimum catalytic ranges.

A second class of catalyst systems effective in the present invention consists of a two-component catalyst system. This catalyst system comprises (A) at least one organoaluminum halide selected from the group consisting of $RAlX_2$ and $R_2AlX$ wherein X is a halide such as chloride, bromide, iodide, and fluoride, and R is selected from the group of alkyl, aryl, arylalkyl and alkaryl, and (B) at least one tungsten derivative.

Thus, representative examples of the first or (A) catalyst component are aluminum compounds having at least one aluminum-to-carbon bond. Representative of such compounds are dialkylaluminum halides such as diethylaluminum chloride, di-n-propylaluminum chloride, diisobutylaluminum chloride, diethylaluminum bromide, diethylaluminum iodide and diethylaluminum fluoride, and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide, and the like; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like.

Representative of the tungsten salts employed as the second or (B) catalysts component include halides such as chlorides, bromides, iodides, and fluorides, which include compounds such as tungsten hexachloride, tungsten hexabromide, tungsten hexaiodide, and tungsten hexafluoride. Other representative salts are those of acetylacetonates, sulphates, phosphates, nitrates, and the like which include compounds such as tungsten phosphate, tungsten nitrate, tungsten acetylacetonate and tungsten sulphate. Mixtures of these salts may also be employed. Of these, it is usually preferred to employ tungsten halides, such as tungsten hexachloride.

The molar relationship between the two catalyst components A and B as previously defined in this catalyst system are within a molar ratio of $A/B$ of about 0.5/1 to about 15/1 with amore preferred molar ratio of $A/B$ of about 0.5/1 to about 8/1 and a still more preferred molar ratio of $A/B$ of about 0.75/1 to about 5/1. These catalysts can be prepared by in situ or preformed techniques. No particular order of addition is required in preparing active catalysts from this species. These catalyst components may be reacted together as pure compounds or in solutions or suspensions in inert liquids. Representative of such liquids are saturated hydrocarbons such as pentane, hexane and the like or aromatic hydrocarbons such as benzene, toluene and the like.

The amount of catalyst employed in the polymerization reactions, when this two-component catalyst system is employed, has not been found to be critical and may range over wide concentrations. Of course, a catalytic amount of the catalyst must be employed but the optimum amount depends upon a number of factors such as temperature employed, the particular reactants employed, the purity of the reactants, the reaction times desired, and the like. Polymerization reactions can be conducted wherein the amount of catalyst is about 0.01 part by weight of the (B) component per 100 parts by weight of the monomer employed with the proper mole ratio of $A/B$ being adjusted.

A third class of catalyst systems effective in the practice of the present invention consists of (A) an aluminum halide, $AlX_3$, and (B) a salt of the transition metal tungsten, whereby the tungsten is at any oxidation status within the IV to VI range.

Representative examples of component (A) are: aluminum chloride, aluminum bromide, aluminum iodide and aluminum fluoride. The preferred halides are the chloride and bromide of aluminum. Examples of component (B) are: tungsten, tetra-, penta- and hexachloride, tungsten tetra- and pentabromide, tungsten tetra- and pentaiodide, tungsten hexafluoride and the tungsten oxychlorides. This two component catalyst system is unique as it does not require the employment of any organometallic catalyst component. However, this system can be further modified by an organometallic reagent. (In certain ring opening polymerizations of unsaturated alicyclic compounds, advantages such as suppression of gel formation, and an increase in polymerization rates at lower catalyst levels can be achieved by the modification of the last two-component catalyst system by a third organometallic reagent). Examples of such organometallic reagents are organoalkali metal compounds such as alkyl and aryllithium; alkyl- and arylsodium; organomagnesium compounds such as dialkyl- or diarylmagnesium; organomagnesium halides; organometallic derivatives of calcium, strontium and barium; alkyls and aryls of Group IIb metals such as dialkyl- and diarylzinc and the like.

Other classes of catalysts which are effective in promoting the polymerizations of this invention are those disclosed in United States patent applications Ser. Nos. 755,374 now U.S. Pat. No. 3,689,471; 755,375 now abandoned; 755,376 and 795,693 now U.S. Pats. 3,577,400 and 3,624,060, respectively.

The operating conditions which are employed in the process of this invention may vary. The reactions can be conveniently carried out in the liquid form or even swollen systems. Thus, if a polymeric material, which is crosslinked or not crosslinked, is involved in any particular reaction, it is possible to carry out the reaction in the presence of a diluent which either dissolves or swells the polymeric material. Solvents which can be used are any inert solvents that preferably dissolve or swell the polymers employed. Convenient solvents are aliphatic, aromatic or cycloaliphatic hydrocarbons which do not themselves inhibit or interfere with the metathesis reaction, such as pentane, hexane, benzene, toluene, cyclohexane, and the like. When the reactants are liquid, the reaction can be conducted in bulk.

The metathesis process involved in this invention can be carried out over a wide range of temperatures. It is convenient to carry out the process at room temperature.

The invention is further illustrated by reference to the following examples which are intended to be representative rather than restrictive of the scope of this invention.

EXAMPLE I

A 5% benzene solution of a narrow molecular weight distribution polybutadiene sample, prepared by an organolithium "living" anionic polymerization method, having an index of heterogeneity, $\overline{M}w/\overline{M}n$, lower than 1.5 if treated by the catalyst combination consisting of $WCl_6 \cdot C_2H_5OH$ and EADC at a molar ratio of $$Al/W/O = 4/1/1$$

the color of the active solution turns red, and a considerable increase in viscosity is noticed. When the mixture is allowed to stand at room temperature for about 30 minutes, then terminated by a methanol solution containing 2,6-ditert.-butyl-p-cresol, and weight average and number average molecular weights are determined on the linear polymeric chains a ratio of weight-average to number-average molecular weight, $\overline{M}w/\overline{M}n$, of about 2 results.

EXAMPLE II

A series of six cyclooctene polymerization experiments was carried out in the presence of variable amounts of 3-hexene. All polymerizations were conducted in benzene solution at a monomer concentration of 1.0 molar. The monomer and solvent were carefully dried by treatment with silica gel prior to polymerization. The 3-hexene was introduced into the polymerization mixture using microsyringes. After charging of the catalyst, the reactions were allowed to proceed for a period of 30 minutes at room temperature. Termination of the polymerization was induced by a solution of isopropanol containing di-tert.-butyl-p-cresol antioxidant.

The relevant data of these experiments is included in the following table:

TABLE 1

| Experiment number | Cyclooctene (gms.) | 3-hexene (gm.×10³) | $WCl_6 \cdot$ EtOH [a] (M×10⁴) | EADC [b] (M×10⁴) | DSV [c] (dl./g.) |
|---|---|---|---|---|---|
| 1 | 5.5 | 0.0 | 0.15 | 0.6 | 4.24 |
| 2 | 5.5 | 4.2 | 0.25 | 1.0 | 2.00 |
| 3 | 5.5 | 21.0 | 0.15 | 0.6 | 1.04 |
| 4 | 5.5 | 84.0 | 0.15 | 0.6 | 0.40 |
| 5 | 5.5 | 332.0 | 0.15 | 0.6 | 0.20 |
| 6 | 5.5 | 630.0 | 0.15 | 0.6 | 0.10 |

[a] A preformed solution in benzene of tungsten hexachloride, which has been reacted with ethanol at a $WCl_6$/EtOH molar ratio of 1:1, having a concentration of 0.05 M.
[b] Ethylaluminum dichloride introduced as a 0.2 M solution in benzene.
[c] Dilute solution viscosity determined in benzene at 30° C. (1 g./l.).

EXAMPLE III

A series of polymerizations of cyclooctene was carried out in pentane, using 17 gms. of monomer in 100 milliliters (ml.) solution. The monomer was freshly distilled over sodium and the solvent passed over silica gel prior to venting on a sand bath. A toluene solution of $$WCl_6 \cdot C_2H_5OH$$

(0.1 M) was injected into the polymerization mixture followed by an EADC solution in pentene, 0.1 M. After allowing the polymerizations to proceed for one hour, 2-octene was introduced into runs 2 and 3 (see Table 2) which caused a drastic reduction in their viscosity. After termination of these polymerizations in a manner similar to Example I, the polymers were dried and their DSV's determined. The relevant data are presented in Table 2.

TABLE 2

| Experiment number: | $WCl_6 \cdot C_2H_5OH$ (M×10⁴) | EADC (M×10⁴) | 2-octene (gms.) | DSV (dl./g.) |
|---|---|---|---|---|
| 1 | 1.0 | 2.0 | 0.0 | 2.02 |
| 2 | 1.0 | 2.0 | 2.9 | 0.36 |
| 3 | 1.0 | 2.0 | 4.4 | 0.31 |

EXAMPLE IV

Cyclooctene [17 ml. (0.13 mole)] and 17 ml. (0.15 mole) of 1-pentene, both freshly-distilled from sodium, were diluted with 80 ml. of dried benzene. The mixture was treated with 0.2 mmole $WCl_6 \cdot C_2H_5OH$ and 0.4 mmole of EADC under nitrogen. After 15 minutes at room temperature, the reaction was terminated by injection of 1 ml. methanol. After removal of benzene and unreacted cyclooctene and 1-pentene by evaporation, the mixture was vacuum distilled and the fraction boiling at 87° C. (at 4 torr) was collected. Analysis by gas chromatography indicated the presence of one component (99% purity). NMR and infrared analysis indicated a structure consistent with 1,9-tridecadiene:

$$C_3H_7CH=CH-(CH_2)_6-CH=CH_2$$

EXAMPLE V

In a similar experiment as in Example IV, using 34 gms. of cyclooctene, 34 gms. of 1-pentene and double the amounts of catalyst components as in Example 4, the product was flash distilled under vacuum and 28.6 gms. of material in the boiling range 65° C. to 230° C. (at 0.8 torr) was collected. Gas chromatographic analysis indicated the presence of three components having structures consistent with the formulas:

$$C_3H_7[CH=CH(CH_2)_6]_nCH=CH_2$$

where $n=1$, 2 and 3. NMR analysis confirmed these structures.

EXAMPLE VI

A mixture containing 14 ml. of freshly distilled 1-pentene (0.127 mole) and 4.0 ml. of freshly distilled 1,5-cyclooctadiene (0.327 mole), in the presence of 20 ml. of dried benzene, was treated at room temperature with an olefin metathesis catalyst comprised of 0.04 mmole $WCl_6 \cdot C_2H_5OH$ in combination of 0.08 mmole of ethylaluminum dichloride. The reaction was conducted under a nitrogen atmosphere and terminated after 60 seconds. The products of the reaction were identified by gas chromatography. The analysis indicated the presence of a series of compounds having structures consistent with the general formula:

$$C_3H_7[CH=CH-CH_2-CH_2]_nCH=CH_2$$

where $n=1$, 2, 3, 4, 5 and 6.

While certain representative embodiments and details have been shown for the purpose of illustrating the invention, it will be apparent to those skilled in this art that various changes and modifications may be made therein without departing from the spirit or scope of the invention.

What is claimed is:

1. A chemical reaction involving subjecting one unsaturated reactant that is free of any non-aromatic conjugation selected from the groups:
    (A) a polymeric material possessing at least two repeat units of the general Formula I:

$$\left[-Z-\underset{|}{\overset{T}{C}}=CH-\right]$$
(I)

wherein:
   (1) T is (a) hydrogen; or
   (b) a substituent corresponding to the formula $D-CH_2-$, where D is any member of the group: alkyl, aryl, aralkyl, alkaryl, alkenyl, cycloalkyl, cycloalkenyl, bicycloalkyl, bicycloalkenyl and hydrogen; and
   (2) Z represents a fragment having at least two carbon atoms that are members of the polymeric main chain and any of the said Z carbons may be
   (a) interconnected by single or double bonds;
   (b) substituted by one or more members of the group: alkyl, aryl, aralkyl, alkaryl, alkenyl, cycloalkyl, bicycloalkyl, cycloalkenyl and bicycloalkenyl;
   (c) constituents of aromatic, alicyclic and chlorinated alicyclic rings; and
(B) at least one unsaturated cyclic compound member of the group consisting of:
   (1) alicyclic compounds corresponding to the formula $$\underset{Q}{\overset{CH=CH}{\diagdown\diagup}}$$

wherein:
   (a) Q is a fragment which comprises a sequence of at least 6 carbon atoms situated in linear succession between the methylidene carbons which constitute the double bond;
   (b) the carbon atoms in the linear succession of Q may be interconnected by both carbon-carbon single bonds and carbon-carbon double bonds;
   (c) any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;
   (d) any of said carbon atoms in the linear succession of Q may be constituents of aromatic rings, alicyclic rings and chlorinated alicyclic rings; and
   (2) alicyclic compounds corresponding to the formula:

$$\underset{P}{\overset{CH=CH}{\diagdown\diagup}}$$

wherein:
   (a) P is a fragment which comprises a sequence of at least 2 and not more than 3 carbon atoms situated in linear succession between the methylidene carbons which constitute the double bonds;
   (b) the carbon atoms in linear succession of P are connected by carbon to carbon single bonds;

(c) any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;

(d) any of said carbons in linear succession of P may be constituents of aromatic rings; alicyclic rings and chlorinated alicyclic rings;

in the presence of an acyclic unsaturated compound (acyclic olefin) corresponding to the general formula:

$$G_2C=CHG$$

wherein:

G is hydrogen or $D-CH_2-$, where D is any member of the group: alkyl, aryl, aralkyl, alkaryl, alkenyl, cycloalkyl, cycloalkenyl, bicycloalkyl, bicycloalkenyl and hydrogen;

to an olefin metathesis catalyst which will convert at least one percent of 2-pentene, when present in a catalytic amount, into a mixture of 2-butene, 3-hexene and 2-pentene in a period of one hour at a temperature less than 100 C., said chemical reaction being carried out in the presence of an inert solvent that does not deactivate said olefin metathesis catalyst, said chemical reaction being conducted at temperatures less than 100° C., to produce polymeric products having controlled molecular weights.

2. The process of claim 1 whereby the catalyst is derived from the group consisting of (A) a salt or a coordination compound of the transition metals tungsten and molybdenum, and (B) an organometallic compound or an organoaluminum halide or an aluminum halide.

3. The process of claim 1 wherein the catalyst is a mixture of:

(A) at least one organometallic compound wherein the metal is selected from the group consisting of Ia, IIa, IIb and IIIa of the Periodic Table of Elements, (B) at least one metal derivative wherein the metal is selected from the group consisting of tungsten and molybdenum, and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a group selected from hydroxyl (OH) and thiol (SH).

4. The process of claim 1 wherein the catalyst is a mixture of:

(A) at least one organoaluminum halide selected from the group consisting of $RAlX_2$ and $R_2AlX$ wherein X is a halide and R is selected from the group of alkyl, aryl, arylalkyl and alkaryl, and (B) at least one tungsten derivative.

5. The process of claim 1 wherein the catalyst is a mixture of:

(A) an aluminum halide of the formula $AlX_3$ and (B) a salt of tungsten wherein the tungsten is at an oxidation state within the IV to VI range.

6. The process of claim 1 wherein the unsaturated reactant is a polyalkenamer whose polymeric repeat unit corresponds to the general formula:

$$\{(CH_2)_m—CH=CH\}$$

where m is 2 or more, and the catalyst is a mixture of:

(A) at least one organometallic compound wherein the metal is selected from the group consisting of Ia, IIa, IIb and IIIa of the Periodic Table of Elements, (B) at least one metal derivative wherein the metal is selected from the group consisting of tungsten and molybdenum, and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a group selected from hydroxyl (OH) and thiol (SH).

7. The process of claim 1 wherein the unsaturated reactant A or B is a polymeric material member of the group: polyisoprene, polybutadiene, isoprene-butadiene copolymer, butadiene-styrene copolymers and polyethylbutadiene.

8. The process of claim 1 wherein the untreated reactant is an unsaturated alicyclic compound member of the group: cyclobutene, cyclopentene, cyclooctene, cyclododecene, 1,5-cyclooctadiene, 1,5,9-cyclododecatriene, 3-methylcyclooctene, 3-phenylcyclooctene, 1-methyl-1,5-cyclooctadiene, 1,2-dimethyl-1,5-cyclooctadiene, 1-ethyl-1,5-cyclooctadiene, and 1-chloro-1,5-cyclooctadiene and the catalyst is a mixture of:

(A) a salt or a coordination compound of the transition metals tungsten and molybdenum, and (B) an organometallic compound or an organoaluminum halide or an aluminum halide.

9. The process of claim 1 wherein the unsaturated reactant is an unsaturated alicyclic compound member of the group: cyclobutene, cyclopentene, cyclooctene, cyclododecene; 1,5-cyclooctadiene, 1,5,9-cyclododecatriene, 3-methylcyclooctene, 3-phenylcyclooctene, 1-methyl-1,5-cyclooctadiene, 1,2-dimethyl-1,5-cyclooctadiene, 1-ethyl-1,5-cyclooctadiene, and 1-chloro-1,5-cyclooctadiene and the catalyst is a mixture of:

(A) at least one organometallic compound wherein the metal is selected from the group consisting of Ia, IIa, IIb and IIIa of the Periodic Table of Elements, (B) at least one metal derivative wherein the metal is selected from the group consisting of tungsten and molybdenum, and (C) at least one compound of the general formula R—Y—H wherein Y is selected from the group of oxygen and sulfur and where R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a group selected from hydroxyl (OH) and thio (SH).

10. The process of claim 1 wherein the unsaturated reactant is an unsaturated alicyclic compound member of the group: cyclobutene, cyclopentene, cyclooctene, cyclododecene, 1,5-cyclooctadiene, 1,5,9-cyclododecatriene, 3-methylcyclooctene, 3-phenylcycloocetene, 1-methyl-1,5-cyclooctadiene, 1,2-dimethyl-1,5-cyclooctadiene, 1-ethyl-1,5-cyclooctadiene, and 1-chloro-1,5-cyclooctadiene and the unsaturated acrylic compound in any member of the group consisting of:

(A) aliphatic terminal olefins of the formula $$G_2C=CH_2$$

and (B) aliphatic internal olefins of the formula $$G—CH=CH—G$$

11. The process of claim 6 wherein the unsaturated acyclic compound is any member of the group consisting of:
(A) aliphatic terminal olefins of the formula and
(B) aliphatic internal olefins of the formula

G—CH=CH—G

12. The process of claim 10 whereby the molar ratio of the unsaturated alicyclic compound to the acyclic unsaturated compound is in the range of about 100,000/1 to 100/1.

13. The process of claim 10 wherey the molar ratio of the unsaturated alicyclic compound to the acyclic unsaturated compound is in the range of about 100/1 to 0.1/1.

14. The process of claim 11 whereby the weight ratio of the unsaturated polymeric reactant to the acyclic unsaturated compound is in the range of about 100,000/1 to 100/1.

15. The process of claim 11 whereby the weight ratio of unsaturated polymeric reactant to the acyclic unsaturated compound is in the range of about 100/1 to 0.1/1.

16. The process of claim 13 whereby the unsaturated alicyclic compound is 1,5-cyclooctadiene or 1,5,9-cyclododecatriene and the acyclic compound is ethylene, propylene, 1-butene, isobutylene or 2-methyl-1-pentene.

References Cited
UNITED STATES PATENTS

| | | | |
|---|---|---|---|
| 3,045,001 | 7/1962 | Berger | 252—429 |
| 3,151,181 | 9/1964 | Hewitt et al. | 260—683.15 D |
| 3,159,614 | 12/1964 | Blogaert | 252—429 |
| 3,163,611 | 12/1964 | Andersen et al. | 252—429 |
| 3,261,879 | 7/1966 | Banks | 260—683 |
| 3,407,243 | 10/1968 | Hyde et al. | 260—677 |
| 3,532,762 | 10/1970 | Corbier et al. | 260—677 |
| 3,535,401 | 10/1970 | Calderon et al. | 260—683 |
| 3,439,057 | 4/1969 | Calderon et al. | 260—666 |
| 3,439,056 | 4/1969 | Calderon et al. | 260—666 |
| 3,424,811 | 1/1969 | Mango | 260—680 |
| 3,527,828 | 9/1970 | Mango | 260—677 |
| 3,595,920 | 7/1971 | Ellis et al. | 260—683 D |
| 3,579,602 | 5/1971 | Reusser | 260—683 |

DELBERT E. GANTZ, Primary Examiner

J. M. NELSON, Assistant Examiner

U.S. Cl. X.R.

260—666 A, 683.15, 683 D